UNITED STATES PATENT OFFICE.

JOHN KAEPPELER, OF NIAGARA FALLS, NEW YORK.

PROCESS FOR FERMENTING STRAIGHT DOUGH.

1,251,044.      Specification of Letters Patent.      Patented Dec. 25, 1917.

No Drawing.      Application filed October 4, 1917. Serial No. 194,782.

*To all whom it may concern:*

Be it known that I, JOHN KAEPPELER, a citizen of the United States, residing at Niagara Falls, in the county of Niagara and State of New York, have invented certain new and useful Improvements in Processes for Fermenting Straight Dough, of which the following is a specification.

This invention relates to improvements in the art of baking, and it more particularly relates to a process of fermenting straight dough, in which all the ingredients thereof are mixed at one time, it being the practice commercially to bake bread, rolls, and other baked goods with straight dough.

The primary object of my invention, hereinafter set forth, is to so treat the dough, regardless of the ingredients or the proportion of the ingredients, that fermentation will take place with scientific accuracy.

Another object of my invention is the treatment of dough during the fermentation period that will enable inexperienced persons to prepare the dough for the ovens with as much success as when the dough is treated by an experienced baker.

With these ends in view my invention consists in the several new and novel steps comprising my process, which is hereinafter set forth and more particularly pointed out in the subjoined claims.

Fermentation of dough as now practised oftentimes results in poor bread, rolls, and other baked goods, for the reason that the treatment of the same is not conducted with accuracy, since the appearance of the dough after it has risen, or the extent of collapse of the risen dough under touch, is depended upon to ascertain, in a degree, the point of fermentation at which the dough is to be further manipulated from time to time, or baked, as the case may be. This, however, is not precise, and oftentimes, as chance may determine, the gluten does not undergo the necessary change to give good volume and fine texture to the bread or other baked goods.

My improved process may be carried out with any straight dough having yeast as one of its ingredients, it being immaterial what other ingredients or proportions of other ingredients are used, as the process will work with scientific accuracy with any practical mixture.

In carrying out my process I employ two fermenting periods of equal, or practically equal, lengths of time, the second period being, however, subjected to certain steps or treatments and being governed by the length of the first period. I may here state that the length of the first period depends considerably upon the quantity of yeast employed in the mixture; upon the temperature of the room in which the dough is kept after being mixed, or upon both the quantity of yeast employed and the temperature of the room.

A practical mixture having the usual quantity of yeast as one of the ingredients thereof, may rise to its full height in approximately two hours' time if the mixture is retained at the proper temperature, this first rising constituting the first half of the process. The second half of the process should, to be scientifically correct, consume a similar length of time, and assuming the first fermenting period to require two hours' time, during the second half period the dough is manipulated at intervals during the same length of time, in a manner to be hereinafter set forth.

When the ingredients of the mixture are properly mixed to form the dough to be fermented, the dough is placed in a trough or other suitable receptacle so as to fill about one-third of its height. The dough then begins to ferment and this fermenting continues until the dough is well stored with gas, this condition being indicated by small holes on the top of the dough, or it may be determined by a slight touch of the hand, whereupon the dough will lose some of its gas and will drop. From the time the mixture or dough has been placed in the trough or other receptacle until it is so sufficiently stored with gas, the first period of my process is taking place, which is exactly one-half of the entire process or the entire fermenting period.

When the dough is properly stored with gas, as last above described, it is punched or worked until most of its gas has escaped, and the edges of the dough, or in other words both of the sides and the ends of the dough, are folded into the center, this treatment being the first step in the second period of my process. The dough is then again fermented for a period of one hour, after which it is again punched or worked to liberate the gas, and the edges, or in other words, the sides and ends of the dough folded into the center. After the second inward folding of the dough, as last above referred to, the dough is again fermented for a period of forty-five minutes and it is then punched or worked a third time to liberate the gas, after which the edges, or the sides and ends, are folded into the center.

If the dough has not completed the second half of its fermenting period by this time, which as above stated should be as long as the first fermenting period, it is again permitted to ferment and is punched or worked after the expiration of fifteen minutes, which action liberates the gas for a fourth time. After so punching or working the dough, the edges, or the sides and ends of the same, are again folded into the center.

Should the first fermenting period require more than two hours, instead of punching or working the dough for the last time after a fermenting period of fifteen minutes, as above described, the punching or working of the dough is to take place at intervals of thirty minutes, during which intervals the dough is permitted to ferment, as above explained; the fermentation is carried on in this way until the second half of the fermenting period equals the length of time required for the first half of the fermenting period. The dough is then ready to be made into bread, rolls, coffee-cake, or other baked goods.

Fermenting dough according to this process brings about certain changes in the character of the gluten which gives the bread or other baked goods good volume and fine texture. Moreover, in baking bread, after treating the dough according to my process, fermentation is controlled with scientific accuracy, and all flour troubles are successfully overcome.

Having thus described my invention, what I claim is,—

1. The herein described process of fermenting straight dough, which consists in allowing the dough to ferment and rise until thoroughly stored with gas, and in punching or working the dough at intervals after the first rising of the same while permitting the dough to ferment between such punching or working intervals, the total length of time of the fermentation periods between such punching or working intervals equaling or approximately equaling the length of time required for the first rising of the dough.

2. The herein described process for fermenting dough, which consists in two fermenting periods of equal or approximately equal lengths of time, the first being consumed for causing the dough to rise the first time and the second consisting of shorter rising intervals interrupted by the punching or working of the dough.

3. The herein described process for fermenting dough, consisting of two equal or approximately equal fermenting periods, the first period being consumed by a continuous fermentation of the dough and the second being consumed by the successively short fermentation periods interrupted by the working of the dough by punching or similar methods.

4. The herein described process of fermenting dough, consisting of two equal or approximately equal fermenting periods, after the first of which the gas of the dough is liberated and during the second of which the gas of the dough is liberated at intervals.

5. The herein described process of fermenting dough, consisting of two equal or approximately equal fermenting periods, after the first of which the gas of the dough is liberated and during the second of which the gas of the dough is liberated at successively shorter intervals.

6. The herein described process of fermenting dough, which consists in preparing the dough and permitting the same to rise, in then liberating the gas by punching or otherwise manipulating the dough, in then permitting the dough to ferment for a period of one hour, after which the gas is again liberated by punching or similar methods, in then permitting the dough to ferment for a period of forty-five minutes, after which the same is again punched or otherwise manipulated to liberate the gas, and in finally permitting the dough to rise until the entire second period equals the time required for the first fermenting period or at regular intervals of thirty minutes interrupted by the punching of the dough to liberate the gas so as to equal the time required for the first fermenting period.

7. The herein described process of fermenting dough, which consists in placing the dough in a suitable trough or receptacle and allowing the same to ferment until well stored with gas, in next punching or otherwise manipulating the dough until most of its gas has escaped, in then folding the dough from its edges into the center, in then allowing the dough to ferment for one hour, in then punching or otherwise manipulating the dough and folding the edges of the same into the center, in then allowing the dough to ferment for a period of forty-five minutes, in then again punching or otherwise manipulating the dough and folding the sides thereof into the center, in then allowing the dough to again ferment for a period of thirty minutes and in then punching or otherwise manipulating the dough and folding the sides thereof into the center and if necessary allowing the dough to ferment at intervals of thirty minutes with such punching or manipulating operations between such intervals until the time from the first punching or working to the finish equals the time up to such first punching or working.

8. The herein described process of fermenting dough, which consists in two fermenting periods of equal or approximately equal lengths of time, the first period being consumed for causing the dough to rise the first time and the second period consisting of successively shorter rising intervals, the dough being punched and the edges or the sides or ends folded into the center between the first and second fermenting periods and between each of the successively shorter rising intervals.

In testimony whereof I affix my signature.

JOHN KAEPPELER.